United States Patent [19]
Peddinghaus et al.

[11] 3,785,235
[45] Jan. 15, 1974

[54] PUNCHING OR SHEARING TRAIN

[75] Inventors: Werner Peddinghaus, Sprockhovel; Ludwig Regenbrecht, Hasslinghauser Str. 129, Gevelsberg, both of Germany

[73] Assignee: said Ludwig Regenbrecht, by said Werner Peddinghaus

[22] Filed: Sept. 24, 1971

[21] Appl. No.: 183,509

[30] Foreign Application Priority Data
Sept. 25, 1970 Germany............... P 20 47 215.5

[52] U.S. Cl.................... 83/557, 83/558, 83/615
[51] Int. Cl................................. B26d 5/12
[58] Field of Search................ 83/556–562, 83/582, 684, 685, 615

[56] References Cited
UNITED STATES PATENTS
| | | | |
|---|---|---|---|
| 1,241,257 | 9/1917 | Wurts et al. | 83/615 X |
| 3,610,083 | 10/1971 | Yasuda et al. | 83/615 X |
| 3,389,627 | 6/1968 | Morley | 83/558 X |
| 3,218,902 | 11/1965 | Berns et al. | 83/582 |

*Primary Examiner*—Andrew R. Juhasz
*Assistant Examiner*—W. D. Bray
*Attorney*—Walter Becker

[57] ABSTRACT

An apparatus for punching or shearing work members by tool elements which are supported in a holder, with one of the tool elements movable toward and away from the other. The holder is supported in a frame in which a work member is guided between the tool elements. The holder is resiliently supported in the frame so that during a work operation the actuated tool element will first engage the work member and then the holder will move to bring the other tool element into engagement with the work member and the work operation is then completed by continuing the actuation of the actuated tool element.

11 Claims, 12 Drawing Figures

PUNCHING OR SHEARING TRAIN

The present invention relates to a punching and shearing train with a feeding device in front of or behind the punching machine or shear, with a bearing surface or bearing line for the material to be punched or cut on the feeding device or the punching machine or shear and with a U-shaped frame supporting the punch and the die or the two shearing blades.

Punching trains are known serving for punching profiled bars by means of which holes are punched at desired distances into the webs and the flanges of profiled bars or structural materials. In this connection, the material to be punched is passed, on a feeding device, through the punching machine. The individual punching devices and tools are fixedly connected to a U-shaped frame of a guiding carriage.

Frequently, the drawback is encountered that when deviations as to shape occur in the tolerance range of the material to be punched or with the curvature of the material to be punched, either the material to be punched cannot be passed with heretofore known trains through the punching devices or a precise spacing of the holes or bores cannot be realized.

Inasmuch as the material to be punched, especially when it is in the form of profiled bars, has generally to meet certain tolerances and curvatures, it is an object of the present invention to provide a punching train whereby within wide limits material to be punched which deviates from the returned masses and shapes can be punched with high precision without difficulty and in particular without any post-adjustment of the punching devices.

It is also an object of this invention to provide a punching train by means of which not only vertical but also horizontal punching operations can be carried out.

It is still another object of this invention to provide a punching train as set forth above which is structurally simple and can easily be serviced. The same objects also apply to shears.

These and other objects and advantages of the invention will appear more clearly from the following specification in connection with the accompanying drawings, in which.

Figure 1:
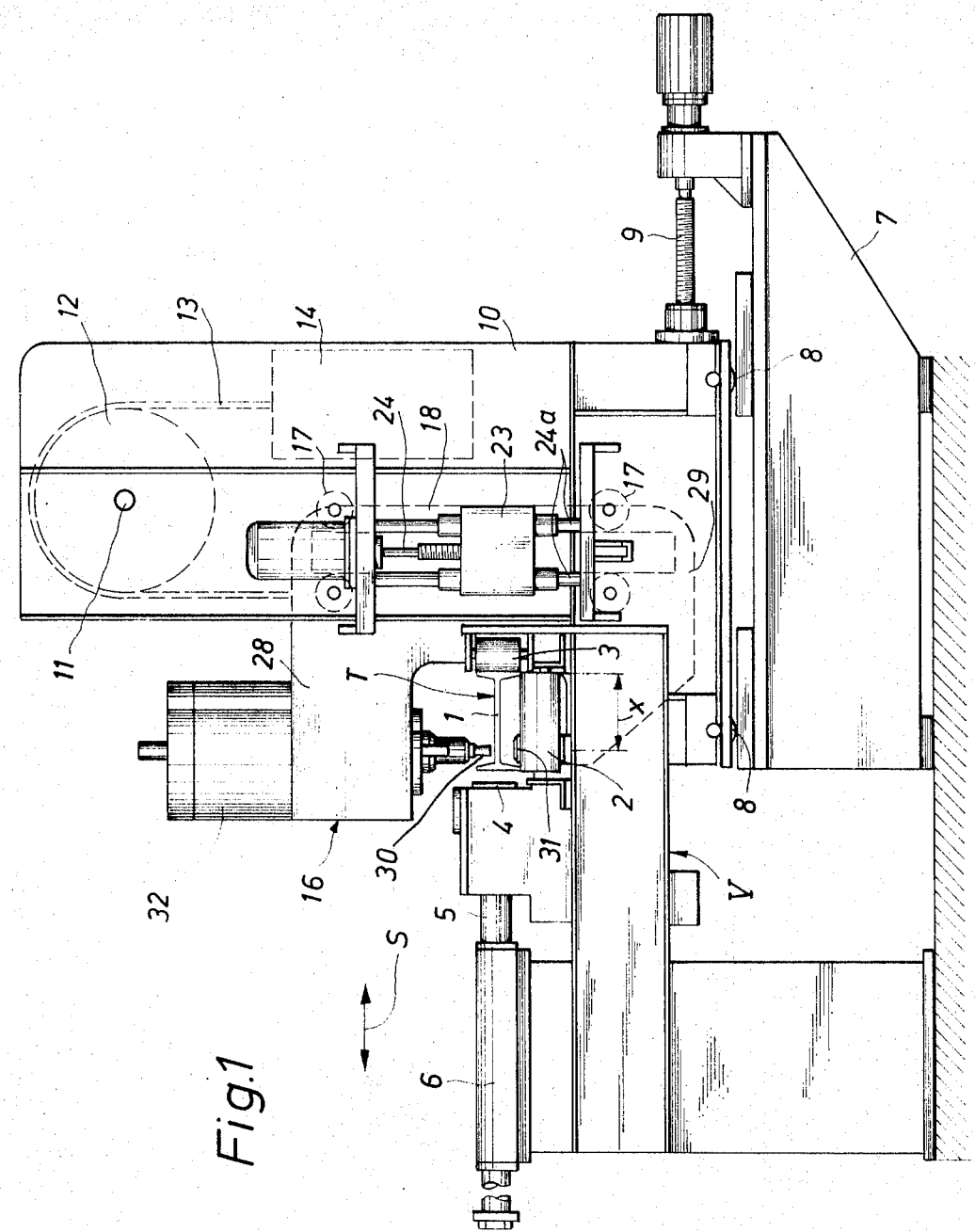
FIG. 1 is a side view of a punching device of a punching train for vertical punching operations.

The punching or shearing train according to the present invention is characterized primarily in that the frame arranged on a carriage, table or slide is adapted in response to the punch impacting upon the material to be punched or cut, to be adjusted automatically by the punch or the upper blade until the die or the upper blade abuts the material to be punched or cut.

The invention will now be described in connection with the drawings, but it is to be noted that while the description will be in connection with a punching device, the invention applies correspondingly to shears. The general idea fundamental to the present invention consists in that the adaptation of the punching tools, i. e. of the punch and the die, are effected by the movement of the punch itself while the deviations in the shape of the material to be punched remain without importance and not always automatically compensated for by the punching tools. Therefore, a post-setting of the tools in case of deviations in the shape of the material to be punched is no longer necessary. The punching tool rather adjusts itself automatically in conformity with the deviation of the shape.

According to a furher development of the invention, the punch frame is held in its central position relative to the material to be punched by spring force. When the tool adapts itself to the various deviations of the material to be punched, the punching tool swings about a central position while the compensating movement of the frame from this central position which is caused by the punching tool, is absorbed by the springs of the frame of the punching device. According to a practical embodiment of the invention, the frame may be provided with an extension which is acted upon on both sides by springs extending in the direction of movement of the frame. Preferably, the springs which hold the frame in its central position relative to the material to be punched, are located in a block which is mechanically, electrically or hydraulically adjustable in the direction of movement of the frame. Thus, the frame which carries the punch and the die is correspondingly adjustable in the punching direction with regard to the location as to height or the horizontal location of the material to be punched. If, for instance, a punching operation is to be carried out in the horizontal web of an I-beam, by mechanically, electrically or hydraulically adjusting the block in which the two frame springs are located, the frame will be adjusted as to height in such a way that the web of the I-beam to be punched will be located approximately in the center between the matrix or die and the punch. The distance of the two tool parts may be so dimensioned that each deviation as to height of the web can be taken into consideration.

According to a further development of the invention, the U-shaped frame carrying the punching tool is suspended on a counter weight when the punching tools are arranged vertically. In this way, the force or power of the punching tool for adjusting the frame is relatively low.

When the punching tool is arranged horizontally and a corresponding horizontal compensating movement of the frame is involved, such counter weight may be omitted.

According to a further development of the invention, the U-shaped frame carrying the punching tools is equipped with a feeler device which is located perpendicularly with regard to the punching movement. By means of this feeler device, it is possible to locate the tools and thus the desired position of the frame and of the carriage or slide.

According to a still further development of the invention for horizontal bores in vertical flanges of I-beams, the train may have two serially arranged U-shaped frames with tools so that such frames form an image of each other and are adjustable together parallel to each other on a table which is adjustable as to height.

With a punching device for vertical holes to be punched, which forms a part of a punching train, the U-shaped frame may be guided vertically on a horizontally displaceable table, carriage or slide and may be suspended on a vertical spring, the lower counter bearing of which is adjustable as to height relative to the table. The carriage, slide or table is equipped with a bar which is adapted to be lifted and lowered vertically and has a dish connected thereto on which the lower counter bearing for the spring rests.

Figure 2:
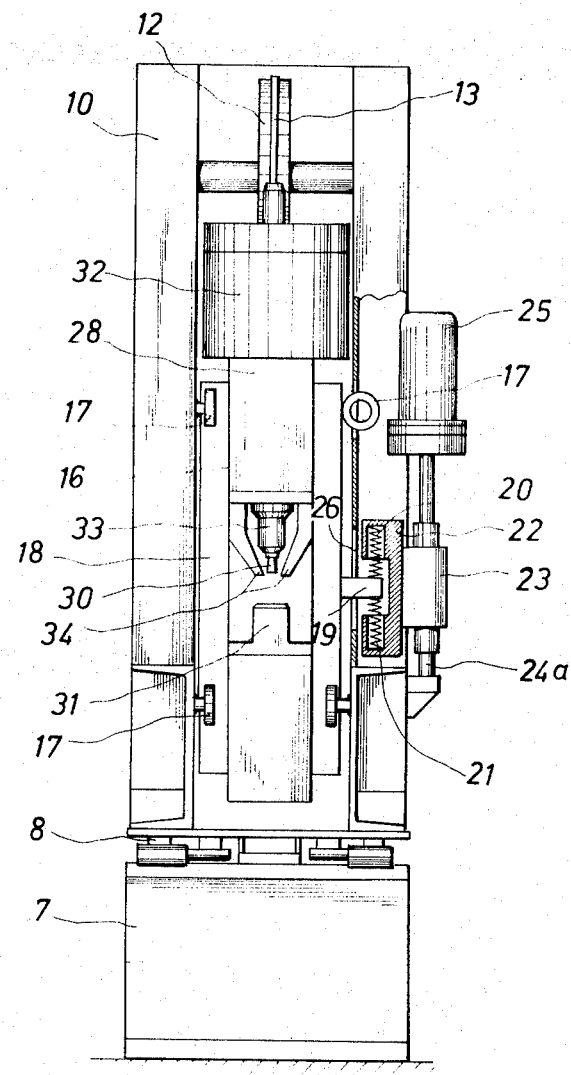
FIG. 2 is a front view of the device according to FIG. 1 partially sectioned.

Referring now specifically to the drawings, FIGS. 1 and 2 show a punching device in a punching train, by means of which device a punching operation is to be effected on the web 1 of the I-beam T. To this end, the material to be punched is advanced, on a roller 2 of the feeding device V, in a direction perpendicular to the drawing plane of FIG. 1 until the driven vertical feeding rollers 3 are stopped. This is effected by a non-illustrated pulse emitter, the pulse number of which corresponds to the desired bore spacing (Y-coordinate) in the longitudinal direction on the web 1. The I-beam profiled bar T is by means of one or more rollers 4 which are controlled by the piston rod 5 of a cylinder 6 pressed against the feeding rollers 3 so that the rollers 3 can be considered the supporting surface or line and thus can be taken as basis for measuring the transverse spacing of the bores on the web (X-coordinate).

The punching tain furthermore includes a foundation part 7 on which by means of rollers 8 and feeding spindle or feeding piston rod 9, the feeding carriage 10 is adjustable in the direction of the double arrow S and thus in the direction of the X-coordinate or abscissa. The X-coordinate of the punched hole on the web 1 is therefore with the embodiment of FIGS. 1 and 2 determined by the adjustment of the feeding carriage, whereas the longitudinal or Y-coordinate is maintained by the feeding rollers 3. If desired, a well-known longitudinal abutment for the Y-coordinate may be substituted for the pulse-controlled feeding rollers 3.

The feeding carriage has within its upper portion a shaft 11 on which a sprocket wheel 12 is journalled over which a chain 13 is passed. Suspended on said chain 13 on one hand is a counter weight 14 and on the other hand a U-shaped frame 16. The U-shaped frame 16 is guided in the carriage 10 in vertical direction by rollers 17 so that the frame 16 will be able to carry out a precisely vertical movement relative to the carriage 10 aligned in the feeding direction S.

The web portion 18 of U-shaped frame has arranged thereon a lateral pivot 19 which according to the embodiment of FIGS. 1 and 2 for a vertical punching tool extends between two vertically extending springs 20 and 21. These springs are arranged in a block 22 which is provided with an extension 23 engaged by the spindle 24 of an adjusting motor 25, said extension 23 being guided on the columns 24a which are arranged in the same manner as on the carriage 10. By means of said motor and said spindle, the blocks 22 can be adjusted as to height. Pivot 19, which extends through an opening 26 of the corresponding frame wall and together with the frame 16 without outer influence, always adopts or occupies a central position between the springs 20, 21 as determined by the position of block 22. The location of frame 16 is selected, by means of motor 25, so that as indicated in FIG. 1, the two tool parts arranged on the legs 28, 29 of frame 16. In other words, the punch 30 and the die 31, will have a certain distance from web 1 in which the hole is to be punched. The distance between the two tool parts 30, 31 is determined by the deviations (tolerance) to be expected at the height of web 1 while taking into consideration the necessary play for displacing the I-beam.

The punch 30 is driven by the punch motor 32 through a corresponding transmission as is known in the art. Laterally of the punch and its holding means 33, the strippers 34 are arranged on the leg 28 of frame 16.

OPERATION

The operation of the device according to FIGS. 1 and 2 is as follows:

After the feeding carriage 10 has been set by means of the spindle or piston rod 9 in the direction of the arrow S whereby the X-coordinate (FIG. 1) is fixed for the hole to be punched, the pulse emitter for the feeding rolls 3 will receive the necessary data for the feeding operation of the I-beam T in its longitudinal direction, which means in a direction perpendicular to the drawing plane of FIG. 1. Instead of impulses of the feeding rollers 3, it is also possible in a manner known per se to determine the longitudinal coordinate Y by correspondingly positioning an abutment in the longitudinal direction. Thereupon, by means of motor 25, the frame 16 is adjusted as to height in such a way that the two tool parts 30, 31 will have the web 1 of the I-beam T located in the center between the two tool parts 30, 31. In this connection, the two springs 20, 21 will be under substantially the same tension. This central position will be realized by having the counter weight 14 represent a weight compensation with regard to frame 16 with its part.

When the punch 30 now moves downwardly for the punching operation onto the web 1 of the profile and when the punch rests upon the web 1, the punch will in accordance with a further downward movement first press the frame 16 against the action of the two springs 20, 21 out of its central position in upward direction until the die 31 abuts the bottom side of web 1. Thereupon, the punch punches out the hole in web 1. During the punching operation, the punch is no longer subjected to any interruption during its downward movement, but the entire operation as described above, will take place during a uniform movement of the punch 30.

When the punch after a completed punching operation again moves upwardly, the die 31 remains on the bottom side of web 1, and the stripper 34 will engage with the top side of web 1 so that the upwardly moving punch can disengage itself from the punched hole. Subsequently, the frame 16, in view of the effect of the two springs 20,21, will swing into a central position illustrated in FIG. 1, in which position the web 1 will have approximately the same distance from the punch 30 and die 31. The springs 20,21 therefore are so designed that in response to the punch 30 sitting down on the web 1, the springs 20,21 will be able to yield without impeding the punching operation. On the other hand, after a completed punching operation, the frame 16 is brought by said springs back to its central position. This operation is aided by the counter weight 14.

Figure 3:
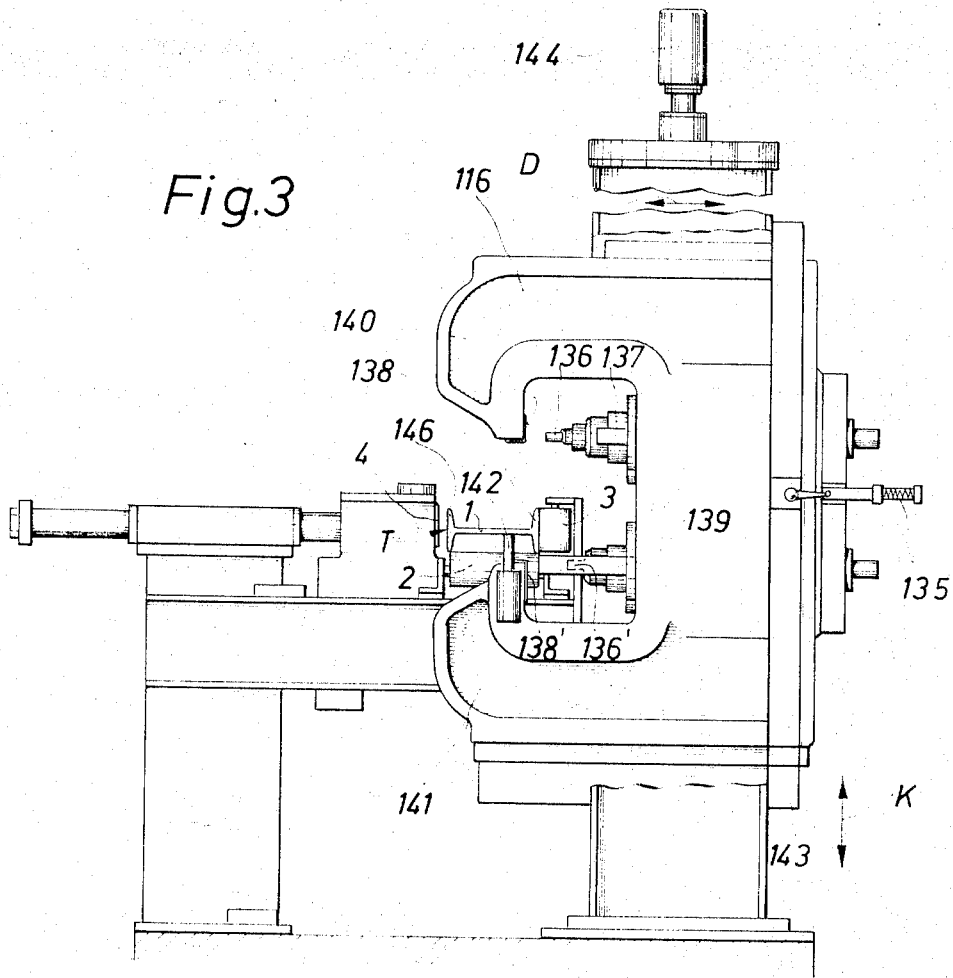
FIG. 3 is a punching device for the same punching train for punching horizontal bores or holes in a vertical flange of an I-beam or I-profiled bar.
Figure 4:
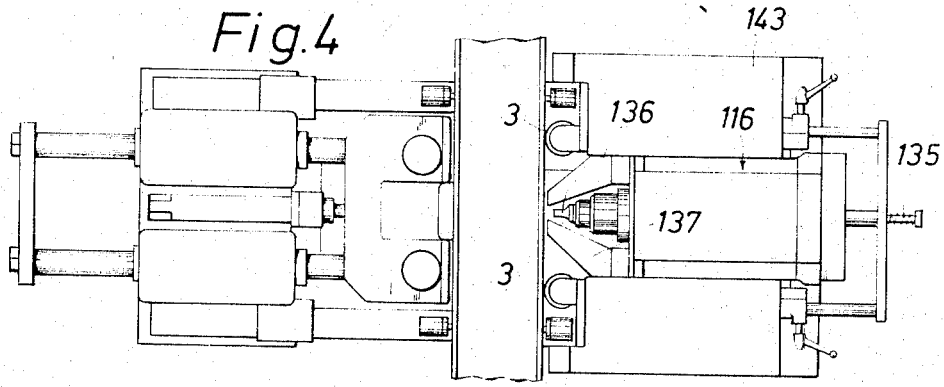
FIG. 4 is a top view of the device according to FIG. 3.

In the embodiment according to FIGS. 3 and 4, one counter weight has been eliminated; such counter weight however has been used as for the horizontally movable frame 116 so that a central position is achieved merely by a spring 135. The problem to be solved by the punching device according to FIGS. 3 and 4 of the punch train, is namely to punch holes above and below the web 1 in the flange 145. The U-shaped frame 116 has two punches 136, 136' which are arranged one above the other and which have associated therewith super-imposed strippers 137,139 and dies or matrices 138,138' in the legs 140,141 of frame 116. Leg 141 is furthermore equipped with a feeler device 142 for the web 1 of the I-beam T. In contrast to the feeding direction of the carriage 10 of FIGS. 1 and 2, the carriage 143 of the embodiment according to FIGS. 3 and 4 is adjustable as to height by motor 144 in the direction of arrow K. In other words, the carriage in the same manner as carriage 10 is adapted to be adjusted in the direction perpendicular to the punching holes. In conformity with the working direction of the punch 136,136', the frame 116 is adjustable in the direction of the double arrow D and is resiliently movable. The spring 135 is effective in the same manner as the springs 20,21 of the embodiment of FIGS. 1 and 2. In other words, the springs, following the horizontal displacement of the frame 116, see to it that the latter is held in a resilient central position. With the embodiment according to FIGS. 3 and 4, the frame 116 may be moved either on guiding rollers or on guiding rails in the horizontal direction.

For purposes of punching holes into the flange 145, the carriage 143 is, after the yieldable feeler 142 has been moved to the web 1, adjusted as to height in such a way that the holes provided below the web 1 can be punched by means of the punch 136'. The punching operation itself is effected in a manner analogous to the punching operation of the punching device according to FIGS. 1 and 2. In other words, the punch 136 or 136' is moved toward the outside of the flange 145 until it abuts upon the flange. During a further movement, the frame 116 in FIG. 3 i adjusted toward the right until the matrix or die 138,138' engages the inner side of flange 145. Subsequently, the punching through of the flange is effected. If by means of the lower punch 136' it is desired to punch holes below the web 1, and if further holes are to be punched above the web, the feeding carriage 143 is lowered so that the punch 136 moves to the level of the holes to be punched above the web 1.

When punching horizontal holes below and above the web 1 of an I-beam, as illustrated, two punching holes 136, 138 and 136' and 138' are necessary. This is due to the fact that the matrix or die 138, 138' of the lower and upper punch by means of web 1 will be prevented from moving over the entire height of the flange 145. For this reason, when punching holes in one leg of L or double-L profile rods, for instance, the application of only one tool 136, 138 will suffice. If holes are to be punched into the flange 146 of the I-beam T, for the punching train according to the invention there is preferred a device as illustrated in FIGS. 3 and 4 which is arranged as an image to the feeding plane which means that the punching dies in FIG. 3 point toward the right.

Figure 5B:
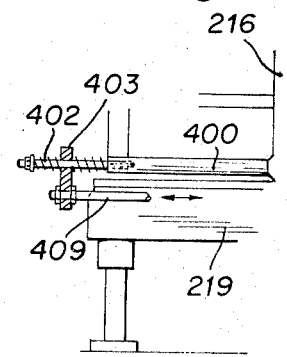
FIGS. 5 to 7 show a punching train with two identical punching frames arranged in series and forming an image of each other and with FIGS. 5a and 5b showing fragmentary views of reversal of features.
Figure 5A:
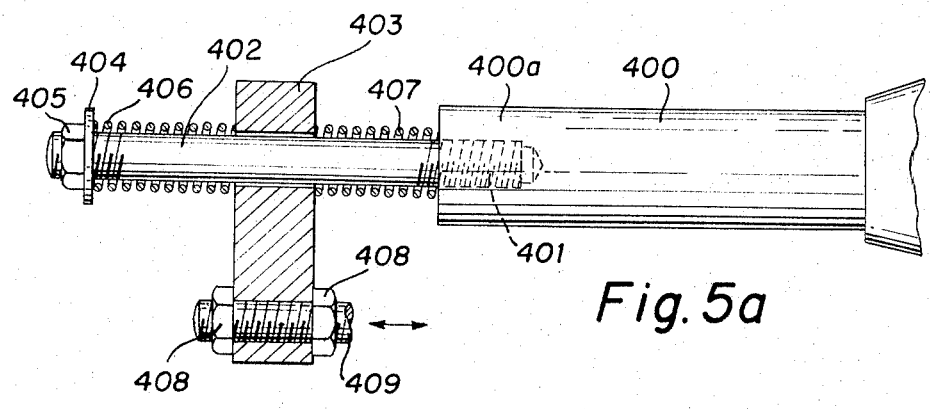
Figure 5:
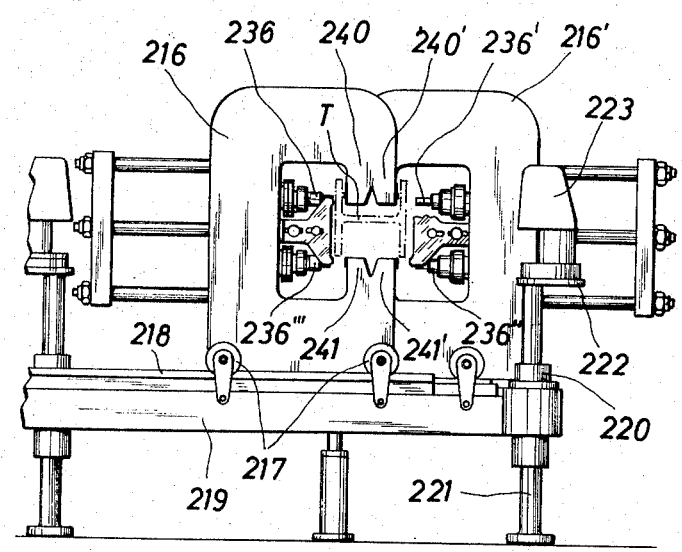
Figure 6:
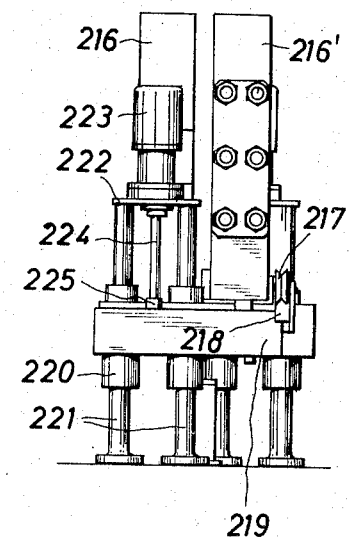
Figure 7:
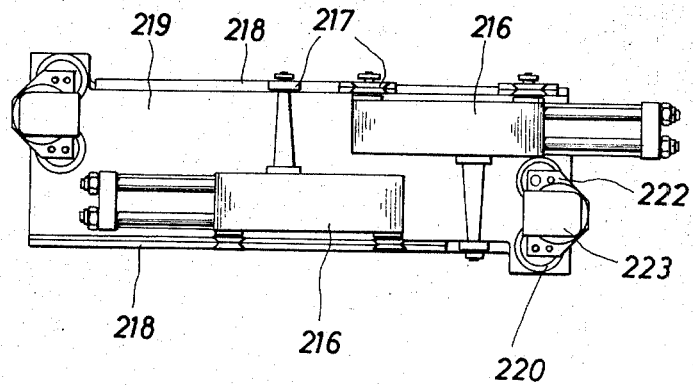

For purposes of a fast punching of holes in both flanges of a double-L or I-beam, an embodiment according to FIGS. 5 to 7 may be selected. With this embodiment, in the feeding device of the illustrated I-beam T, two identical serially arranged frames 216, 216' forming an image to each other are used with an upper punch 236 and 236' each and with a lower punch 236" and 236"'. These punches have associated therewith in legs 240 and 240' and 241 and 241' the corresponding matrices or dies. The frames 216, 216' are movable by means of rollers 217 on guiding rails 218 in the punching direction and are subject to the influence of a spring device corresponding to the springs 20, 21 of the embodiment of FIGS. 1 and 2 or the springs 135 of the embodiment of FIGS. 3 and 4. The guiding rails 218 are arranged on a table 219 which latter has its end provided with guiding bushings 220 which are guided on columns 221. These columns are arranged in pairs for supporting a traverse 222. Mounted on said traverse 222 is a motor 223 adapted to drive an adjusting spindle 224 which latter engages a corresponding threaded member 225 on table 219. The two motors 223 on both ends of the table run synchronously and lift and lower the two frames, 216, 216' simultaneously.

In FIGS. 5a and 5b respectively there is illustrated a spring device of a part 21b corresponding analogously to the spring device according to FIGS. 1 and 2. On each of the parts 216, 216' there is provided a horizontal rod 400 in which as far as to a location in the vicinity of the edge of the frame 219 there is an end 400a of the threaded head 401 that projects from a spring rod 402 and that is threaded therewith; the same projects through a web 403 in which the rod 402 is longitudinally shiftable; the free end of the spring rod 402 carries a support disc 404 with a nut 405 which is adjustable upon the threads of the spring rod 402. Between the support disc 404 and the one face side of the web 403 as well as between the rod 400 and the second face side of the web there is arranged a spring means respectively (406,407).

The web 403 is connected with a piston rod 409 by means of two nuts 408; the same is longitudinally adjustable by way of a pressure means cylinder or actuator (not shown in the frame).

If the piston rod 409 is adjusted, there is change also in the middle position of the carriages 216 respectively 216'. Each of the carriages carries a device described in the same way; the frame 219 provides an adjustable piston rod 409 with a cylinder on each of its sides.

Compared with the original illustrations of FIGS. 1 and 2 and the description thereof, the foregoing spring arrangement as described represents a reversal of features.

Figure 8:
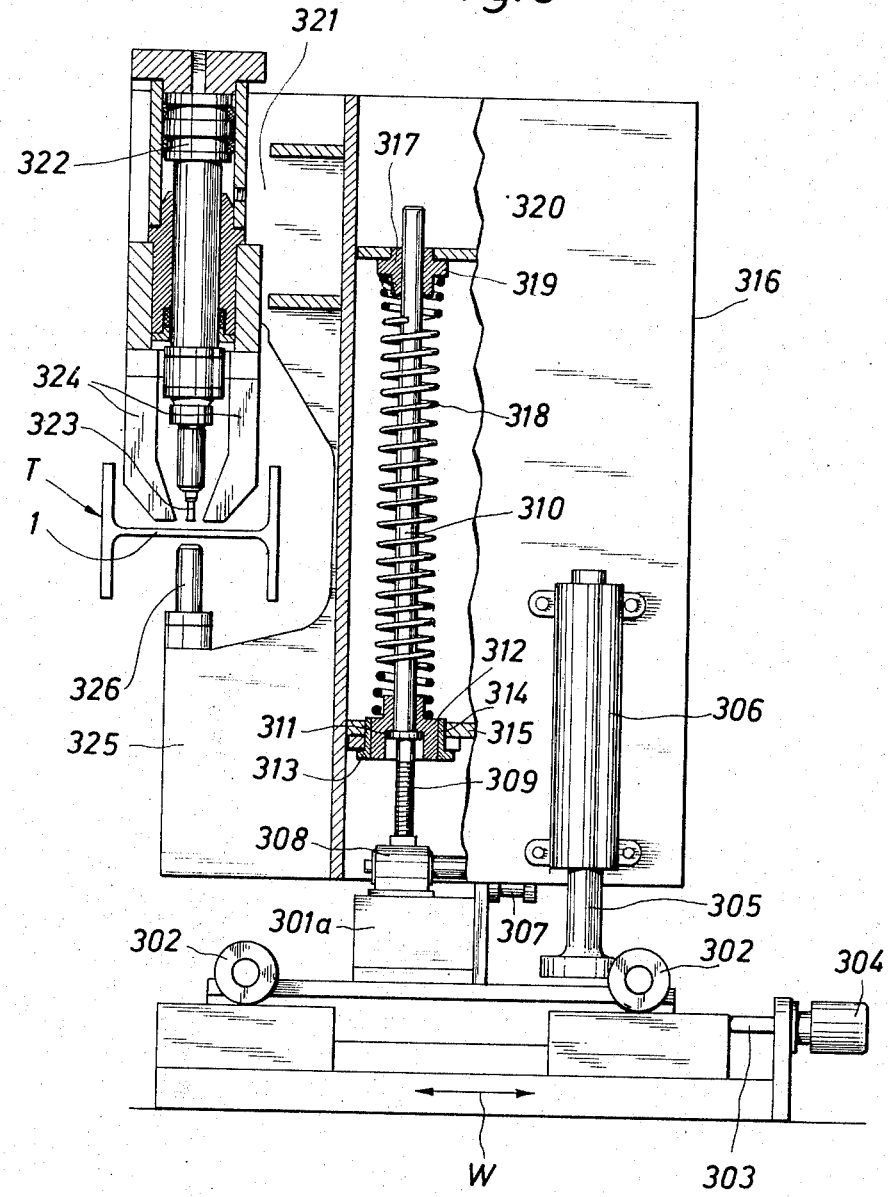
FIGS. 8 to 10 illustrate a further embodiment of a punching device according to the invention for vertical holes to be punched, in three positions of the frame.
Figure 9:
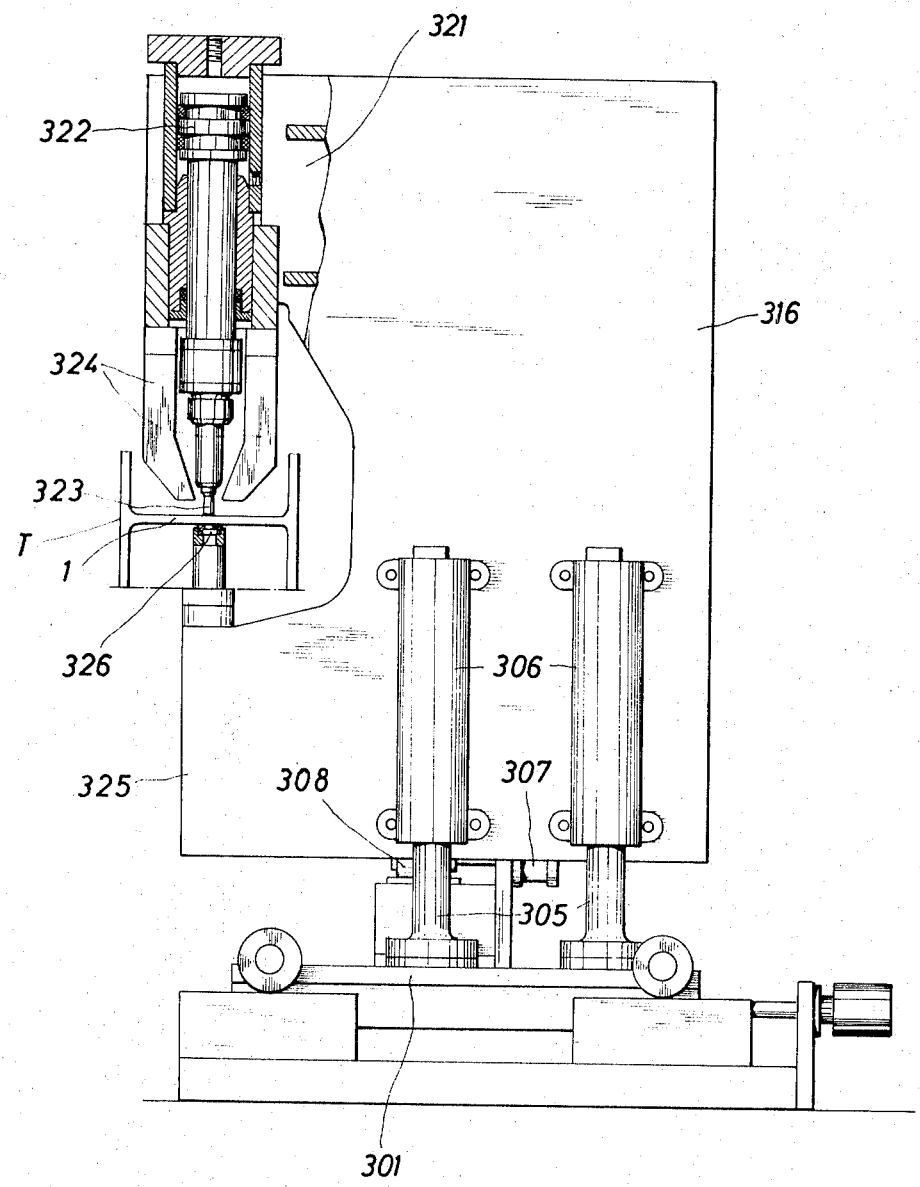
Figure 10:
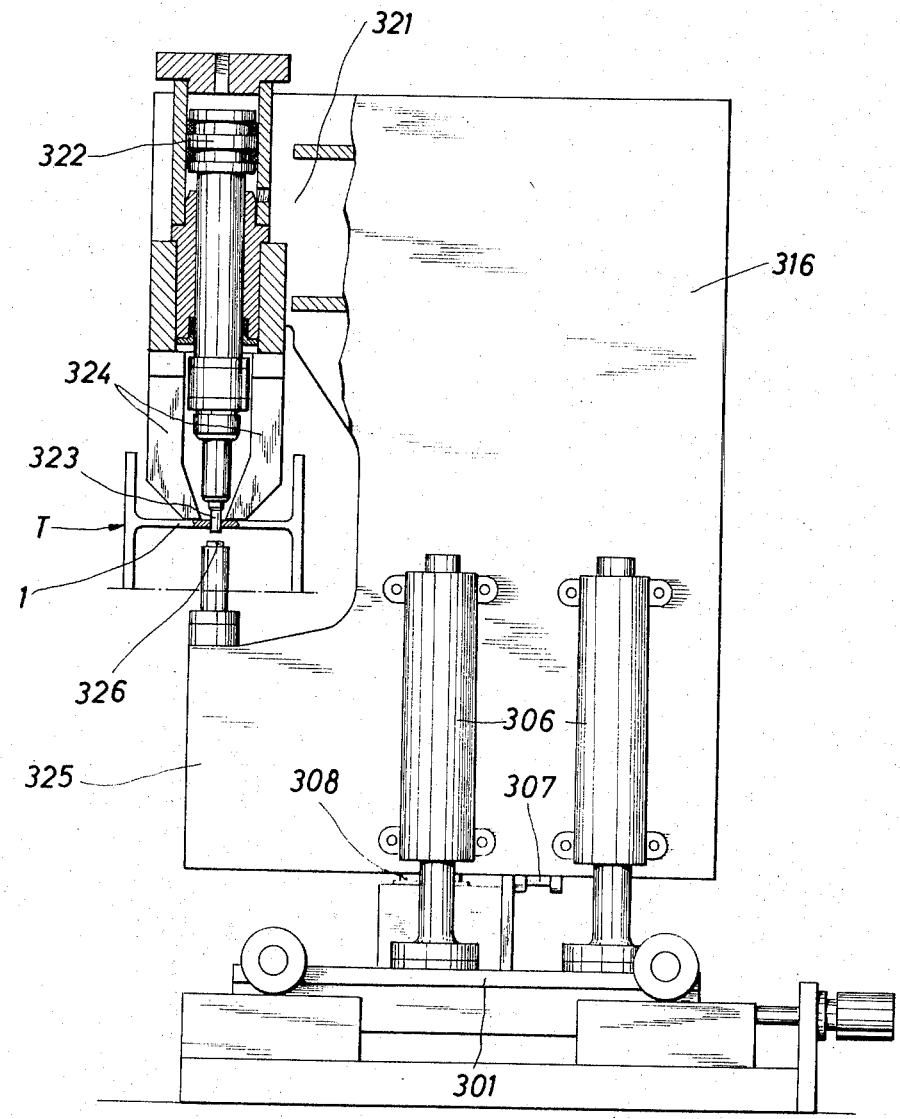

FIGS. 8, 9 and 10 show a further embodiment of the invention of a vertically effective punch, and more specifically, in its position "prior to punching," "punching operation" and "stripping off." The table 301 is horizontally movable by means of rollers 302 and spindle 303 and motor 304 in the direction of the double arrow W. The said table 301 supports four guiding columns 305 which each lead one bushing 306 each perpendicular to the table 301. On a block 301a on table 301, there is arranged an angle drive 308 of a motor 307 which is mounted on the table. The angle drive actuates a spindle 309 which is axially movable in response to a rotation of said spindle and has a shank 310 which is free from thread and merges with a dish 311 fixedly connected thereto. The dish 311 is adapted to be engaged by a bushing-shaped spring counter bearing 312 which is guided by the shank 310 and carries a sliding mantle 314 provided with a flange 313. The said flange 313 is adapted from below to engage and rest against a horizontal partition 315 of frame 316 which is guided on the columns 305 by means of the bushings 306.

The upper end of shaft 310 extends freely through the second counter bearing 317 while spring 318 extends between the counter bearing 317 and the counter bearing 312. The second counter bearing 317 has its flange 319 from below engage and rest against a second partition 320 of the U-shaped frame 316. The frame 316 similar to the embodiment of FIGS. 1 and 2, carries in its leg 321 the drive 322 for the punching lever, the punch 323, and the stripper 324, whereas the die or matrix 326 is arranged on the leg 325.

In the starting position "prior to the start of the punching," the parts occupy the position illustrated in FIG. 8 after the precisely horizontal position of the hole to be punched was determined by means of the feeding device and the spindle 303. In the position shown in FIG. 8, by means of spindle 309 and shank 310, the frame 316 has occupied a position as to height in which web 1 of the I-beam is located in the center or nearly in the center between the punch 323 and matrix 326. To this end, motor 307 may be actuated correspondingly. When the punch 323 moves downwardly onto the web 1 of the profiled beam, the frame 316, while being aided by spring 318 is lifted to such an extent that the matrix 326 engages web 1 from below. In this connection, the lower spring counter bearing 312 rests against the dish 311, and spring 318 relaxes slightly. The punch subsequently will in conformity with the punching operation shown in FIG. 9 pass through the web 1 of the work piece.

After completion of the punching operation, the strippers 324 impact upon web 1 so that during the retraction of punch 323 the latter will be freed from the profiled iron. Simultaneously, however, the frame 316 returns to its starting position shown in FIG. 8.

As will be evident from the above, the present invention creates the possibility to carry out a punching operation in quick succession and without adaptation of the work pieces to the tolerance mass and deviations from the standard masses. The present invention is applicable in the same manner to all tools with which, similar to punching operations both tool parts must exert the same pressure from two opposite directions upon the work piece as is the case, for instance, when carrying out shearing operations. Thus, the present invention is, by no means, limited to punching operations, but is also applicable to shears in which the lower cutting blade by resting the upper blade onto the work piece engages the work piece from below.

It is, of course, to be understood that the present invention is, by no means, limited to the particular showing in the drawings but also comprises any modifications within the scope of the appended claims.

What is claimed is:

1. In an apparatus for operating on a work member by first and second tool element means disposed on opposite sides of the work member; holder means supporting said tool element means in opposed spaced relation, drive means in said holder means operable for moving said first tool element means toward said second tool element means for a work operation and then away from said second tool element means after a work operation, a punching frame, integrally only C-formed work member guide means in the frame for supporting a work member to be operated between said tool element means, and support means supporting said holder means in said frame for movement of the holder means in the frame in a direction parallel to the direction of movement of said first tool element means, said support means permitting movement of said holder means in the frame when said first tool element means engages said work member during a work operation thereby to cause said second tool element means also to move into engagement with said work member.

2. An apparatus according to claim 1 in which said support means comprises centering spring means and said work member is disposed about midway between said tool element means.

3. An apparatus according to claim 1 in which said holder means comprises lateral extension means thereon, and said support means comprises springs disposed between opposite sides of said extension means and said frame.

4. An apparatus according to claim 1 in which said holder means comprises lateral extension means thereon, box means into which said extension means extends, said support means including centering springs disposed in said box means on opposite sides of said extension means, and connecting means adjustably connecting said box means to said frame.

5. An apparatus according to claim 1 in which said tool element means are spaced in the vertical direction and said first tool element means and said holder means are moveable in the vertical direction, and counterweight means in said frame connected to said holder means and counterbalancing the weight thereof.

6. An apparatus according to claim 1 which includes feeler means in said frame engageable with said work member and acting in a direction perpendicular to the direction of movement of said first tool element means.

7. In an apparatus for operating on a work member by first and second tool element means disposed on opposite sides of the work member; holder means supporting said tool element means in opposed spaced relation, drive means in said holder means operable for moving said first tool element means toward said second tool element means for a work operation and then away from said second tool element means after a work operation, a frame, work member guide means in the frame for supporting a work member to be operated between said tool element means, and support means supporting said holder means in said frame for movement of the holder means in the frame in a direction parallel to the direction of movement of said first tool element means, said support means permitting movement of said holder means in the frame when said first tool element means engages said work member during a work operation thereby to cause said second tool element means also to move into engagement with said work member, said holder means comprising a pair of U-shaped holders each having a first and a second tool element therein, said holders being serially arranged in the direction of movement of the work member in the frame and being reversed relative to one another.

8. An apparatus according to claim 7 in which said tool elements in said holder are spaced in the horizontal direction, and said frame includes a table adjustable therein in the vertical direction and supporting said holders.

9. An apparatus according to claim 1 in which said first tool element means is moveable in the vertical direction, said support means comprising vertical centering spring means bearing at the top on said holder means, and plate means vertically adjustable in said frame and engaging the lower end of said spring means.

10. An apparatus according to claim 9 which includes shaft means on said frame extending axially through said spring means and threadedly engaging said plate means.

11. An apparatus according to claim 1 which includes table means on said frame supporting said holder means and moveable on the frame in a direction perpendicular to both the direction of movement of said first tool element means and the direction of movement of said work member.

* * * * *

UNITED STATES PATENT OFFICE
CERTIFICATE OF CORRECTION

Patent No. 3,785,235         Dated   January 15, 1974

Inventor(s)  WERNER PEDDINGHAUS, ET. AL.

It is certified that error appears in the above-identified patent and that said Letters Patent are hereby corrected as shown below:

On the cover sheet [73], the assignee should read as follows:

-- said Regenbrecht assignor to said
   Peddinghaus -- .

Signed and sealed this 13th day of August 1974.

(SEAL)
Attest:

McCOY M. GIBSON, JR.
Attesting Officer

C. MARSHALL DANN
Commissioner of Patents